United States Patent [19]

Miller

[11] Patent Number: 4,907,674
[45] Date of Patent: Mar. 13, 1990

[54] RESCUE PLATFORM

[76] Inventor: Myron F. Miller, 8141 Campbell St. #112, Kansas City, Mo. 64131

[21] Appl. No.: 213,679

[22] Filed: Jun. 30, 1988

[51] Int. Cl.⁴ ............................ B62B 5/02; E04G 3/08
[52] U.S. Cl. ..................................... 182/150; 182/55; 182/92; 182/206; 280/30; 280/47.27
[58] Field of Search ................... 182/150, 92, 206, 55, 182/54, 53; 280/47.29, 30, 655, 47.18

[56] References Cited

U.S. PATENT DOCUMENTS

| | | | |
|---|---|---|---|
| 893,930 | 7/1908 | Lederman | 182/150 |
| 957,324 | 5/1910 | Gall | 182/150 |
| 2,378,678 | 6/1945 | Anderson | 182/150 |
| 2,843,393 | 7/1958 | Dahlander | 280/47.18 |
| 3,829,113 | 8/1974 | Epelbaum | 280/30 |
| 4,222,136 | 9/1980 | Valentino | 182/92 |
| 4,275,894 | 6/1981 | Mortenson | 280/655 |
| 4,321,982 | 3/1982 | Strickland | 182/20 |
| 4,407,521 | 10/1983 | Zeitlin | 280/655 |

Primary Examiner—Reinaldo P. Machado
Attorney, Agent, or Firm—Edward L. Brown, Jr.

[57] ABSTRACT

A deep water rescue platform incorporating a support frame with a pair of hanger arms for engagement with the side of a pool which are telescopingly adjustable with the frame, a pair of wheels attached to the bottom of the support frame for transportation and stabilizing engagement with the wall of the pool, and a platform hingedly attached to the lower end of the frame which folds into the plane of the frame during storage and a locking means for retaining the platform in its extended position.

6 Claims, 2 Drawing Sheets

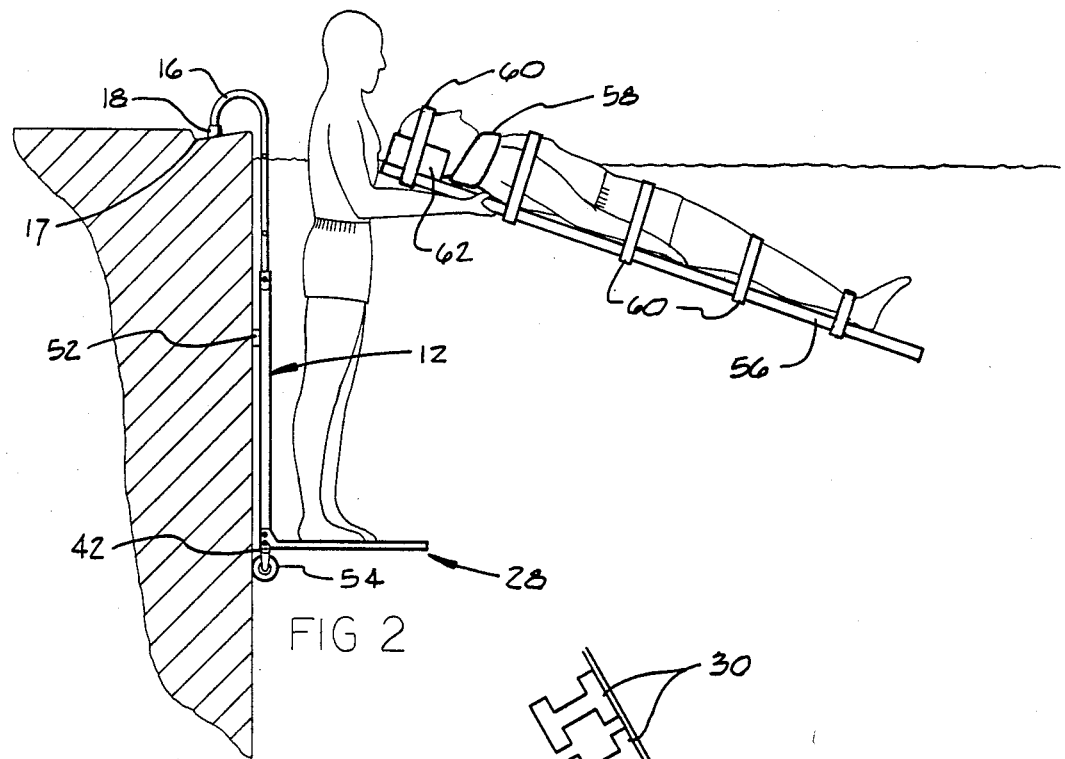
FIG 2
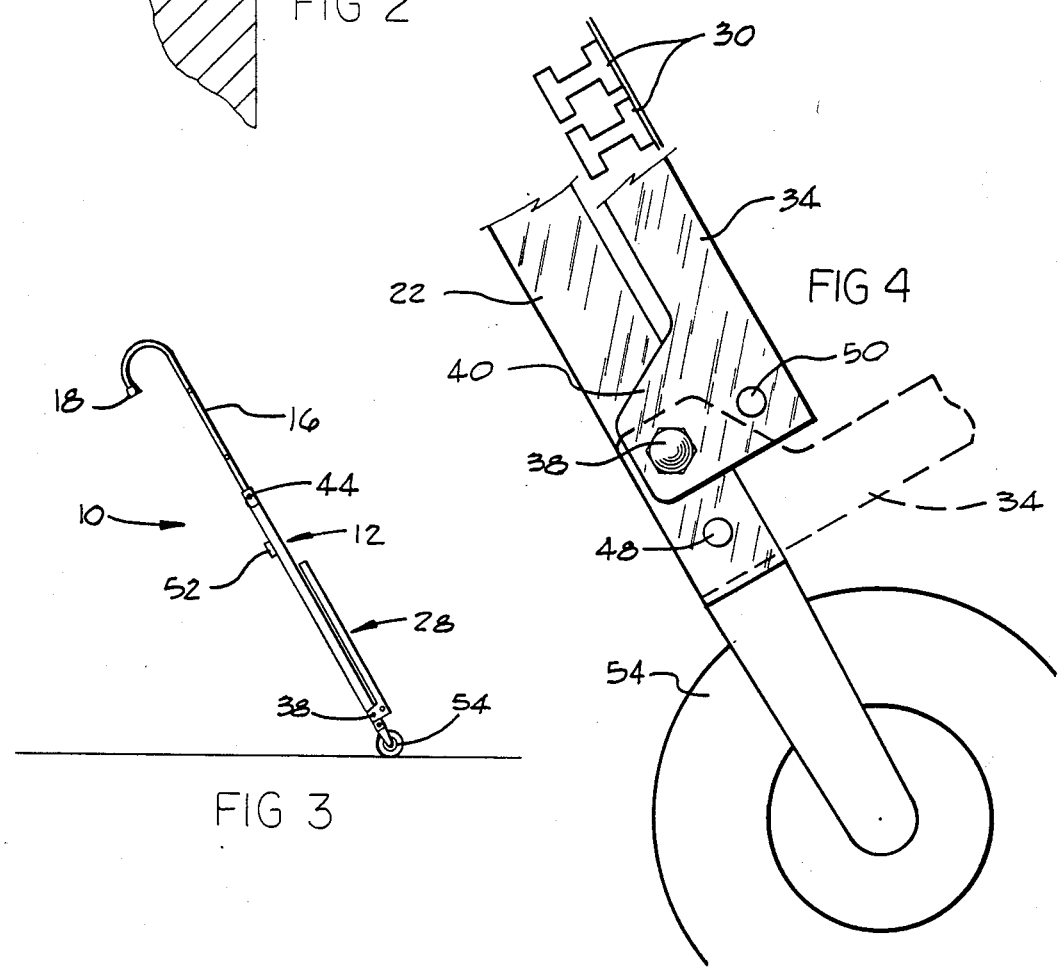
FIG 3
FIG 4

RESCUE PLATFORM

BACKGROUND OF THE INVENTION

The invention relates to a rescue platform utilized in deep water pools for spinal-type injuries. Most diving-related injuries involve injury to the spinal column and therefore the victim must be very carefully handled because of the great potential for further injury to the spinal cord. For that reason, the victim is very carefully immobilized by attachment to a backboard prior to removal from the pool.

The rescue procedure in a deep water pool prior to the present invention is rather difficult and requires a minimum of seven persons to hold the victim's head above water, to insert the backboard under the victim and maintain it in a horizontal position while the victim is secured to the board and then removal from the water. In a pool with a shallow end, the procedure is much simplified since the rescuing personnel can stand on the bottom of the pool during the procedure.

The prior art deep water technique first involves the lifeguard bringing the victim to the corner of the pool head first with the victim's face out of the face water and body bisecting the angle of the corner. In the absence of a ladder in the corner, an assistant outside the pool must support the lifeguard since both of his hands are engaged in holding the victim. Two more assistants in the pool support the victim in the hip area with one arm while their other arm grips the edge of the pool. Two additional assistants then maneuver the backboard submerged. The board is passed under the victim's feet, on up to his head, all the while the three persons are supporting the victim until the backboard is finally in place. With the backboard in place, a plurality of retention straps are carefully tied around the victim to the board in the ankle area, knee area, waist area, chest area, and lastly, around the head to immobilize the neck and spine as much as possible before lifting the victim from the pool. In the prior art method, the actual lifting from the pool had to be done by persons out of the pool which was particularly difficult since the victim on the backboard had to be held horizontal at all times, both in the water and upon lifting from the water.

The rescue platform of the present invention allows a single person to take the place of three others since that person is standing on a platform without need of hanging on to the edge of the pool and can exert a tilting moment with both arms so as to keep the victim essentially horizontal in the water with the mouth and face sufficiently elevated for breathing. The rescue technique with the present invention eliminates at least two persons from the procedure while also shortening the time to perform the procedure.

SUMMARY OF THE INVENTION

The portable rescue platform of the present invention is designed to be folded up and stored on the wall like a life ring and rope so that it can be readily unfolded and wheeled to the edge of the pool for engagement with the pool gutter system to provide a rigid and stationary platform approximately four to five feet below the surface of the water. The platform can be adjusted to various depths due to its telescoping hanger arms, to accommodate the height of the lifeguards on duty at the time of the rescue attempt. The platform in its cantilevered configuration grips the gutter system and a side wall of the pool at three contact points on each side of the platform thereby providing a very firm attachment to the pool without a positive attachment means on the pool wall.

It is therefore the principal object of the present invention to provide a portable deep water rescue platform for spinal injuries in pools or at dockside.

Another object of the present invention is to provide a deep water rescue platform which is lightweight and foldable for compact storage which can be readily unfolded and wheeled in place on the edge of a pool.

A further object of the present invention is to provide a deep water rescue platform which when placed under load provides an improved support system.

A still further object of the present invention is to provide a lightweight high-strength cantilevered design rescue platform with a high friction platform and universal adjustable length hanger arms which can accommodate all shapes of swimming pool gutter systems.

Another object of the present invention is to provide a teaching platform for scuba diving as well as other ingresses or egresses from the water to the side of a boat or dock.

These and other objects and advantages of the present invention will be apparent from the following description, the accompanying drawings and the appended claims.

BRIEF DESCRIPTION OF THE DRAWINGS

FIG. 2 is a side elevational view of the platform in use, hanging on the edge of a swimming pool;

FIG. 3 is a side elevational view of the rescue platform in its stored position; and FIG. 4 is a partial view to an enlarged scale of the lower end of the rescue platform with the platform shown in its folded and extended positions.

DESCRIPTION OF THE PREFERRED EMBODIMENTS

Figure 1:
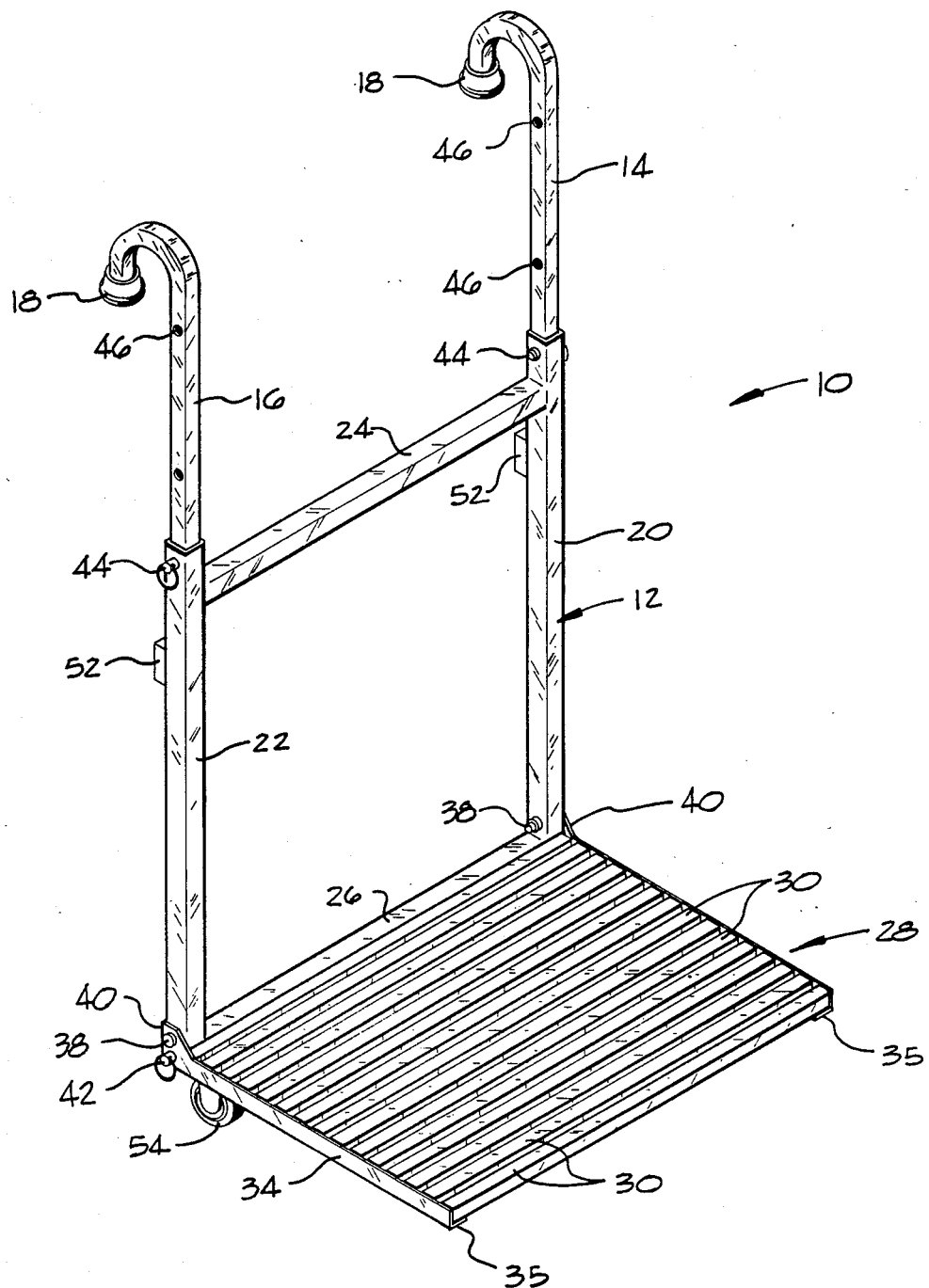
FIG. 1 is a perspective view of the rescue platform.

The rescue platform of the present invention, as best seen in FIG. 1, is generally described by reference numberal 10, and includes a support frame 12 to which the platform 28 is pivotally connected. The support frame 12 comprises a pair of side rails 20 and 22 which are welded to two lateral section members 24 and 26 in a rectangular shape. Telescopingly inserted inside side rails 20 and 22 are a pair of hanger arms 14 and 16, respectively, which provide a means for hanging the rescue platform on the side of the pool, as seen in FIG. 2. Hanger arms 14 and 16 include a series of holes 46 therein, which are in turn engaged by locking pins 44 which can be removed to vary the height of the platform 28 to the water level.

Pivotally connected to the lower ends of the support frame 12 is a platform generally described by reference numeral 28. The platform 28 comprises a pair of support brackets 32 and 34 which are formed from angle iron which have a horizontal leg 35 for supporting the ends of a series of deck elements 30. Deck elements 30 are I-beam in cross section, as seen in FIG. 4, and constructed of non-metal material such as Nylon, Duradeck, as well as numerous plastics. The decking elements 30 have a roughened surface to improve traction for the rescue personnel standing on the platform. The platform 28 is pivotally connected to the support frame by a pair of bolts 38 which pass through an offset leg portion 40 of the support brackets 32 and 34. With the pivot axis of the platform offset from the plane of the platform, the platform in its folded condition lies in a parallel plane with the support frame 12, as best seen in FIG. 4. Located in the bottom of side rails 20 and 22, is a hole 48 which aligns with a similar hole 50 in the support bracket 34 when the platform is swung out to its operative position which is normal to the plane of the support frame 12. A removable locking pin 42 is then inserted through holes 50 and 48 to carry the moment load on the platform between pivot bolt 38 and pin 42.

Attached to the bottom of the support frame are a pair of rubber tired wheels 54 which are positioned along a common axis which lies in the plane of the support frame with the riding surface of the wheel extending behind the support frame to provide a resilient non-slipping support pad for the rescue platform, while in use. Wheels 54 are also utilized to transport the rescue platform from its stored position to the pool. The tubing utilized to construct the support frame and hanger arms is preferably aluminum or stainless steel to eliminate the corrosion problem present in swimming pool areas.

OPERATION

The rescue platform 10 of the present invention is normally stored in some area of close proximity to the pool, such as on wall hooks. After removal from its stored position, the rescue platform 10 can be transported, as seen in FIG. 3, by wheeling the platform to the edge of the pool. The normally folded platform is then swung out normal to the frame 12 and locking pins 42 are then inserted in holes 50 and 48 to fixedly secure the platform in its cantilevered support position. The rescue platform 10 is then lowered into the pool with the hook-shaped ends of hanger arms 16 engaging the gutter of the pool through support pads 18. The particular geometry of the hook-shaped ends is designed to accommodate a variety of gutter systems used in various pools. With the rescue platform 10 in place, as seen in FIG. 2, the platform has a three-point contact with the pool wall through support pad 18, bumper pad 52 positioned on the backside of support frame 12, and rubber wheels 42. Due to the cantilevered geometry of this design, a substantial load is placed on all three of the support points thereby enhancing the engagement of the rescue platform 10 to the pool wall.

While FIG. 2 only illustrates a single rescue person, two other personnel, not shown in the drawing, are required to position the backboard under the victim and attach the victim to the backboard with the use of retention straps 60, cervical collar 58 and head supports 62. With the rescue person, as seen in FIG. 2, standing on the platform, it can be readily seen that even though he is located at the head-end of the victim, he can apply sufficient lifting moment to the board and the victim to maneuver the victim in a floating horizontal position before removal from the pool. This allows the primary rescue person much more leverage than the prior art system which requires the rescue person to hang onto the wall of the pool with one arm or utilize his feet in the ladder holes while pushing against the corner wall. With the other two rescue pesons located in the water, the victim attached to the board, can be floated to the edge of the pool so that other rescue personnel standing outside the pool can finish tying the victim to the board and lift the victim out of the water.

The rescue platform 10, when hanging on the wall in its folded condition, occupies very little space and its overall weight is not so great that one person can readily transport the platform to its operative position in the pool.

The rescue platform can also be utilized for scuba diving instruction, either in a pool or on the edge of a dock or boat, wherever a temporary partially submergible platform is desired. The platform can also be used on a variety of other types of injury situations other than spinal injuries. While the particular design of the apparatus herein described constitutes the preferred embodiment of the invention, it is to be understood that the invention is not limited to these precise forms of apparatus, and that changes may be made therein without departing from the scope of the invention which is defined in the appended claims.

What is claimed is:

1. An emergency rescue platform for use in deep water for spinal injury victims comprising:
    a support frame including two side rails having upper and lower ends and at least two lateral sections;
    a platform means hingedly attached at one side thereof to the support frame allowing the platform to rotate from a stored position, parallel to the frame, to its use position normal to the frame;
    a pair of adjustable length hanger arms with hook-shaped ends for engaging a pool surface, each arm telescopingly received within a frame side rail;
    locking means on the side rails for holding the platform's load in its use position; and
    a support means attached to the support frame for contact with the pool wall.

2. An emergency rescue platform as set forth in claim 1, the support means including a pair of wheels attached to the support frame below said platform to assist in transporting the rescue platform from the stored position into the pool.

3. An emergency rescue platform as set forth in claim 1, wherein the support means includes a three point support system including a pad on the hook end of the hanger arms, a pad on the back side of each side rail approximate the upper end and a third support point being the wheels which extend from the back side of said frame.

4. An emergency rescue platform as set forth in claim 1, wherein the locking means includes a removable locking pin, a hole in the side rail and a hole in the platform means which is laterally offset from the hinge axis which aligns with the hole in the side rail when the platform is in its use position.

5. An emergency rescue platform as set forth in claim 1, wherein the hinge axis of the platform is positioned out of the plane of the platform while the locking means is positioned substantially in the plane of the platform.

6. An emergency rescue platform as set forth in claim 2, wherein each wheel is attached approximate the lower end of a side rail with both wheels on a common axis parallel to the hinge axis of the platform.

* * * * *